D. J. Keller,
Cattle Pump.
No. 85,832. Patented Jan. 12, 1869.
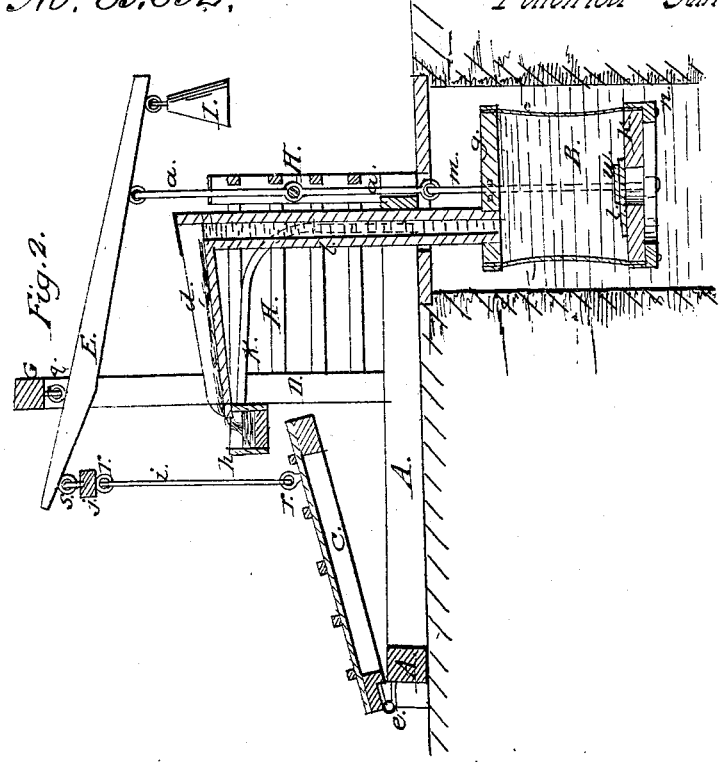
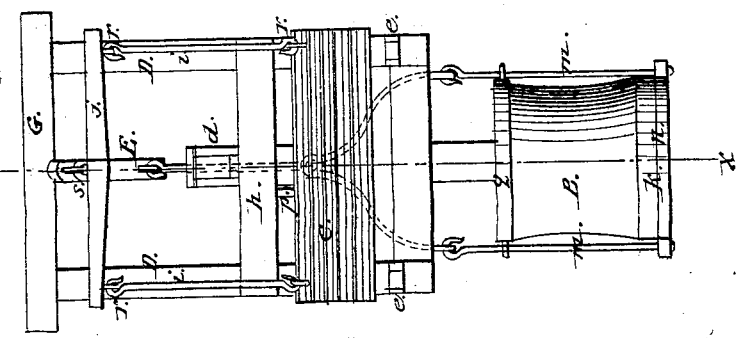
Witnesses:
W. C. Ashkettle
Wm. A. Morgan
Inventor:
D. J. Keller

United States Patent Office.

D. J. KELLER, OF KANE, ILLINOIS.

Letters Patent No. 85,832, dated January 12, 1869.

---

IMPROVEMENT IN CATTLE-PUMPS.

---

The Schedule referred to in these Letters Patent and making part of the same.

---

To all whom it may concern:

Be it known that I, D. J. KELLER, of Kane, in the county of Greene, and State of Illinois, have invented a new and improved Water-Elevator for Stock; and I do hereby declare that the following is a full, clear, and exact description thereof, which will enable others skilled in the art to make and use the same, reference being had to the accompanying drawings, forming part of this specification.

Figure 1 is a front view of my invention.

Figure 2 is a sectional view of the same through the line x–x, fig. 1.

Similar letters of reference indicate corresponding parts.

The nature of this invention relates to the elevation of water for the purpose of supplying stock, and consists of the apparatus hereinafter described.

The general features of the invention consist of a hinged platform upon which the animal steps to approach the trough, and the weight of the former causes the platform, through the interposition of proper mechanism, to compress a water-bellows, which forces the water into the said trough.

In the accompanying plate of drawings, a front view of the invention is shown at fig. 1, and a section of the same at fig. 2.

A is the bed-frame, supporting the superincumbent parts, which consist of the uprights D and cross-beam G of the same, under which latter is supported a lever beam E by iron eye-bolts q, as shown.

The platform C is connected with the lever-beam, the cross-bar j, and side-rods i i, as shown, r r r r and s being the eye-bolt connections thereof.

The lever beam is connected with the water-bellows B by an iron rod, a a, and the side-rods m m of the bellows, as shown.

The upper head g of the bellows is affixed to the vertical pipe b, which latter is affixed in any suitable manner to the bed-frame A, as shown.

The pipe b communicates with a spout, d, which latter discharges into the trough h affixed to the uprights D D.

A weight, I, assists the long arm of the lever-beam to balance the platform, and the lead rim n, affixed to the bottom disk, keeps the bellows distended when the platform is free from weight—any other than its own weight.

A valve, l, covers an opening in the bottom disk. This is also weighted at u, as shown.

A pipe, p, serves to conduct the water back into the cistern when the trough is filled beyond a certain point.

The bellows are immersed in the water, as shown, and when an animal steps upon the platform C, in approaching the trough, the bottom disk K of the bellows is lifted, which compresses the leather cylinder B of the bellows, and the water contained therein is forced up through the pipe b and discharged into the trough h, as shown.

When the animal steps from the platform, the weight n again extends the bellows downward, and the pressure of the water lifts the valve l and fills the bellows, which so remain until compressed again.

The fence H is for the purpose of causing the stock to approach the trough in front and upon the platform.

The frame and larger parts of this elevator are of wood, the rods and eye-bolts being of iron, and being generally simple and containing no mechanism liable to get out of repair or be injured by the elements.

This invention supplies a want long felt by the agricultural and stock-raising interest in those localities where streams of running water are scarce, as in the prairie-region of the West and elsewhere.

In such localities wind-wheels are largely employed to raise water from the depth of a few feet below the surface, for the use of stock. These wheels are expensive, and continually getting out of repair. My invention dispenses with such wheels, and provides, besides, a watering-trough for stable and roadside-use.

I claim as new, and desire to secure by Letters Patent—

The combination of the lever E, platform C, pipe b, bellows B, trough h, and spout d, substantially as shown and described, when constructed and operated for the purpose of lifting water for stock by the weight of the animal, all as set forth.

D. J. KELLER.

Witnesses:
W. R. WOOD,
HENRY D. FIELD.